April 25, 1950
H. D. LOSS
2,505,194
SHIPMENT OF CALCIUM CHLORIDE IN TANK CARS
Filed Feb. 9, 1949
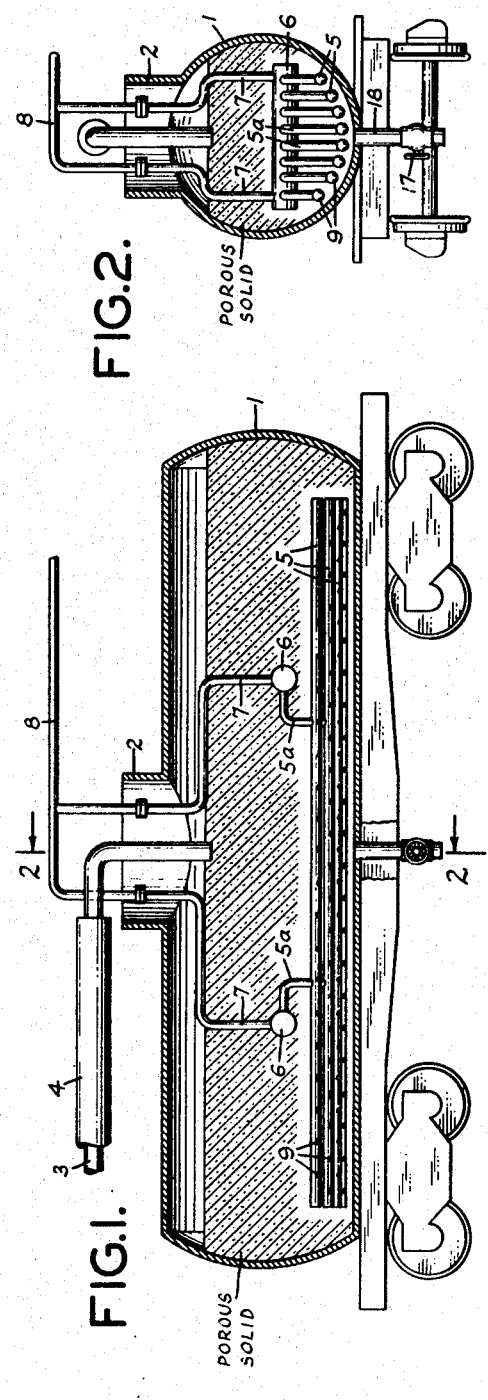
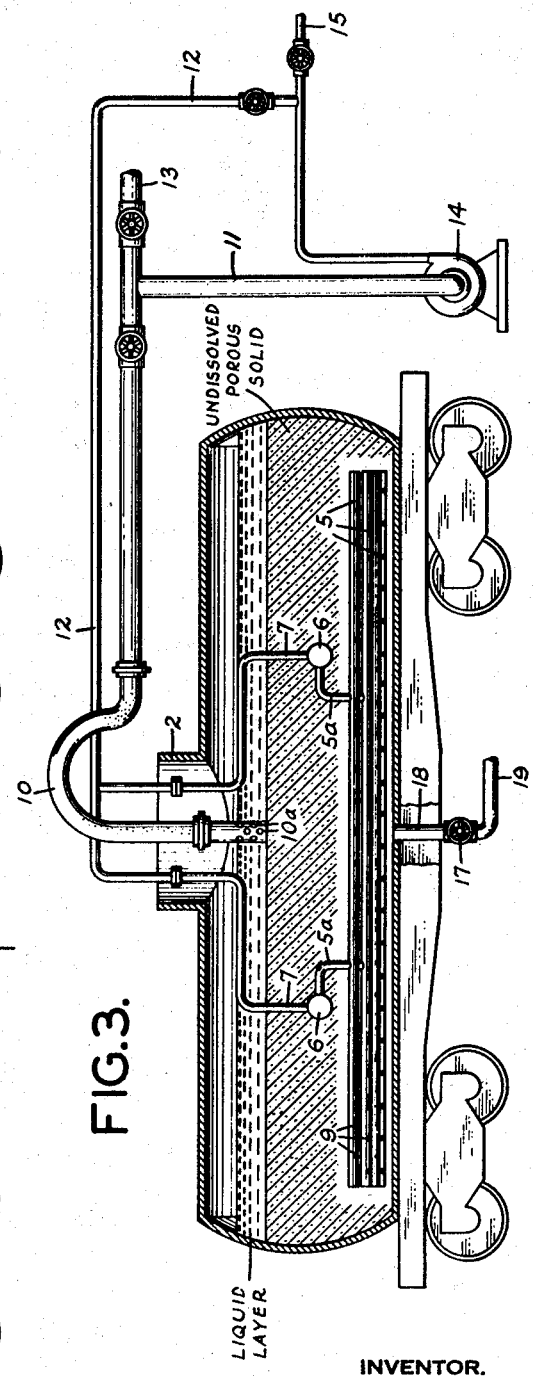
INVENTOR.
HAROLD D. LOSS
BY Alvin Engelstein
ATTORNEY.

Patented Apr. 25, 1950

2,505,194

UNITED STATES PATENT OFFICE 2,505,194

SHIPMENT OF CALCIUM CHLORIDE IN TANK CARS

Harold D. Loss, Camillus, N. Y., assignor to Allied Chemical & Dye Corporation, New York, N. Y., a corporation of New York Application February 9, 1949, Serial No. 75,367

6 Claims. (Cl. 214—152)

1

This invention relates to a method of shipping calcium chloride and more particularly refers to a new and improved method of loading highly concentrated calcium chloride liquor in tank cars and unloading the same.

Large quantities of calcium chloride in solution form are employed for freezeproofing of ores, solid fuels, stone, etc., where a 30% solution is commonly used. High freight charges preclude the shipping of dilute (30–50%) calcium chloride in solution. A number of large consumers who use calcium chloride solution for freezeproofing and dustproofing purchase 77–80% flake calcium chloride and dissolve it in water to a 30% solution. While there is an appreciable saving in freight charges in the shipment of 78% calcium chloride flake as contrasted with the shipment of 30% calcium chloride liquor this saving is offset by (a) increased cost of manufacturing calcium chloride flake, (b) packaging the flake in bags, (c) loading the bags in freight cars, (d) unloading the bags from the freight cars at the point of destination and (e) dissolving the flake to the desired 30% calcium chloride concentration.

The shipment of highly concentrated calcium chloride liquor in tank cars suggests itself as a means of transporting calcium chloride without incurring the difficulties and costs involved in shipping either 30% calcium chloride solution or 78% calcium chloride flake. Unfortunately, shipment of concentrated calcium chloride solutions presents certain problems which make it uneconomical to transport by usual method such calcium chloride liquors in tank cars. While the problems encountered in shipping other solutions, for example 73% caustic soda, have been solved satisfactorily, the same procedure has been found inapplicable to concentrated calcium chloride solutions due to its different properties and, therefore, concentrated calcium chloride liquor has heretofore not been shipped in tank cars. Caustic soda tank cars can be "thawed" by low-pressure steam whereas calcium chloride requires steam at over 115 p. s. i. gauge to free it of crystals. Crystals begin to separate from a 73% caustic soda solution when the temperature is lowered to 145° F. and it solidifies at 144° F. whereas 70–72% calcium chloride in solution begins to crystallize at 334–340° F. and solidifies at 113° F. Thus it is evident that customary steaming satisfactory for removal of caustic soda from tank cars would be of little service in unloading calcium chloride.

A primary object of the present invention is

2 to provide an economical method for loading and unloading concentrated calcium chloride solutions in tank cars.

Another object of the invention is to provide a method of treating molten calcium chloride in tank cars so as to produce a porous solidified calcium chloride mass therein.

A further object of the invention is to provide a method for facilitating removal of solid calcium chloride from tank cars as a water solution.

Other objects and advantages of the present invention will become apparent from the accompanying drawings and the following description.

A principal "bottleneck" preventing the successful shipment of concentrated calcium chloride liquor in tank cars resides in the low rate of solution of the dense solid calcium chloride in the tank car requiring several days to effect removal therefrom. I have discovered that this difficulty may be obviated by forming a porous calcium chloride solid in the tank car which will dissolve rapidly in water, reducing the unloading time to approximately 24 hours or less.

A preferred method of carrying out the present invention comprises introducing molten calcium chloride of 60 to 73%, preferably 70 to 72%, calcium chloride content into a tank car and simultaneously introducing compressed air into the bottom of the tank car for sufficient length of time to form a porous solidified calcium chloride mass therein.

As a result of aeration the calcium chloride mass in the tank car is porous and dissolves rapidly in water. Previously removal of dense solid 70–72% calcium chloride from a tank car was found commercially impractical because it dissolved too slowly.

Unloading of the tank car is accomplished by introducing water to the porous calcium chloride to produce about a 30% calcium chloride solution which is pumped to storage. Recirculation of the water effects more rapid dissolution of the calcium chloride.

Referring to the drawings:

Figure 1 diagrammatically represents a longitudinal section of a tank car in partial section together with appropriate piping for loading the tank car.

Figure 2 is a cross section through the center of the tank car and piping illustrated in Figure 1 and taken on line 2—2 of Figure 1.

Figure 3 diagrammatically illustrates a longitudinal section of the tank car with connecting piping and pump for unloading the tank car.

In Figure 1 is illustrated a conventional tank car 1 open at its top through dome 2 through which heated calcium chloride liquor coming directly from the manufacturing process and called pan calcium chloride is introduced through pipe 3 surrounded by steam jacket 4 to prevent solidification before entering the tank car. At the bottom of the tank car are a series of pipes 5 each approximately 2 inches in diameter and about 30 feet long lying lengthwise in the tank car, thus forming a group of 8 pipes arranged 4 on each side of the center line and lying within an inch or two of the bottom and lining the lower one fourth of the tank circumference. Each horizontal pipe 5 disposed adjacent to the bottom of tank car 1 has a series of spaced 1/8 inch holes 9 along the bottom of the pipes. Placing of holes 9 in the bottom of pipes 5 has the effect of causing the air to flow through a greater height of liquid calcium chloride than if the holes were on top of pipe 5 and also permits better drainage of liquid from pipes 5 and connecting conduits during the unloading of the tank car. These air pipes are also used for introducing water into the mass of solidified calcium chloride when unloading the tank car.

While, for the purposes of illustration, eight 2-inch horizontal pipes 5 have approximately 800 spaced 1/8 inch holes at the bottom thereof are shown in the drawing, any number of pipes of suitable size and with sufficient orifices may be provided to introduce a plurality of streams of air throughout the body of calcium chloride liquor in the tank to effect conversion of the liquor into a porous solid calcium chloride.

Pipes 5 are manifolded through conduits 5a and through transverse headers 6 to conduit 7 passing upwardly out through dome 2 and then to conduit 8 connected to a suitable compressed air supply, for example, compressed air at 100 p. s. i.

At the bottom of tank 1 is drawoff opening 18 from which the residual contents of tank 1, after unloading, may be drained through line 19 and valve 17. (See Figure 3.)

In the process of loading tank car 1 the flow of compressed air is started through conduits 8 and 7, headers 6 and manifolds 5a into pipes 5 and out through orifices 9. Heated concentrated calcium chloride solution continuously flows through steam-jacketed line 3 into tank car 1 until the tank car is substantially filled, during which time air from orifices 9 passes upwardly in a plurality of streams through the body of molten calcium chloride in tank car 1 imparting porosity to the mass of calcium chloride solidified upon cooling of the concentrated solution. It is desirable to continue the introduction of air into the body of calcium chloride liquor for an appreciable length of time, say for example 20 to 30 hours, after the tank car has been filled with liquor in order to insure solidification of the calcium chloride therein and the retention of the porous condition of the mass. When the calcium chloride in tank car 1 has been cooled to a firm solid porous mass, introduction of compressed air is discontinued; the connections of conduit 7 with air supplying conduit 8 are broken; the pipe 3 to the supply of calcium chloride liquor is removed; the dome cover with gasket fastened down; and the tank car is ready for transportation to its proper destination.

As a practical matter the piping arrangement comprising pipes 5, manifolds 5a, transverse headers 6 and conduits 7 may be permanently attached to tank car 1. Tank cars fitted with such piping could be employed for carrying other liquors since the entrance to and discharge from the tank car are not blocked and since the piping occupies a relatively small volume of space in the tank car.

A feature of the present invention resides in maintaining stationary pipes 5 having a plurality of orifices 9 in the tank car as a common discharge means for air during the loading operation and for introduction of water during the unloading operation.

Although the introduction of air into the body of molten calcium chloride has been described with respect to cooling and forming a solid porous calcium chloride mass, the passage of air therethrough serves another function, namely, opening of channels leading from orifices 9 to the top surface of the calcium chloride. By discharging water through orifices 9 into the pores and channels of the solidified mass a large surface of the solid calcium chloride is exposed to the solvent action of water, thereby accelerating the solution of the salt. The channels formed by the air in the calcium chloride also act as passageways for the dilute calcium chloride solution circulating through the solid during unloading. Thus it will be evident why more rapid dissolution occurs in the practice of the present invention as contrasted with previous attempts to dissolve a mass of calcium chloride which had only the upper surface exposed to the action of water.

Figure 2 is a cross section through the center of Figure 1 showing the piping arrangement in the tank car when loading. Calcium chloride liquor is introduced into the top of tank car 1 through steam jacketed conduit 3. Compressed air is forced through conduit 7, transverse headers 6, manifolds 5a, pipes 5, through orifices 9 and thence up through the body of liquid calcium chloride.

Upon arrival of tank car 1 at its destination conduits 7 are connected through conduit 12 to the outlet of pump 14, and suction extension inlet line 10 through conduit 11 to the inlet of pump 14 located adjacent to the tank car at ground level. A water line 13 connects with the pump inlet and water is first fed through the pump and discharged through conduits 12 and 7, transverse headers 6, manifold 5a, pipes 5 and orifices 9 into the channels and pores of the body of porous calcium chloride in tank car 1 until a liquid layer, about 10 inches, covers the top surface of the solid calcium chloride. This water solution then may be concentrated by recirculating the solution through the suction inlet 10a, flexible conduit 10, conduit 11, to pump 14 and discharged back into the car through lines as described above. When the concentration has reached approximately 30% calcium chloride, the solution is pumped to storage through discharge conduit 15.

Concentration of the calcium chloride solution may be determined at frequent intervals by the simple expedient of taking hydrometer readings. As the volume of calcium chloride solids in tank 1 decreases appreciably the rate of solution to obtain a 30% calcium chloride solution diminishes. Therefore, it may be found desirable during the forepart of unloading the tank car to remove a calcium chloride solution which has a higher concentration than 30% and towards the end of the unloading operation when the quantity of solid calcium chloride is small to remove a solution which has a calcium chloride content of less than 30% and commingling the more concentrated and the less concentrated solutions in a storage tank to produce a mixture having a concentration of 30% calcium chloride. Of course, if this mixture has a concentration higher than 30% calcium chloride and a more dilute solution is desired, water may be readily added to the mixture in the storage tank to lower the concentration.

The following example illustrates the present invention:

The conventional tank car of approximately 88 inches in diameter and 32 feet in length having a capacity of about 10,000 gallons is fitted with piping as illustrated, in Figure 1, that is eight 2-inch horizontal pipes approximately 30 feet long were placed in the bottom of the tank car parallel with the center line of the tank car and separated from one another by 6 to 8 inches. These pipes, capped at both ends, have two series of staggered 1/8 inch holes spaced approximately 8 inches apart along the length of the pipe facing the bottom of the tank car. A transverse manifold header joins all eight pipes to two conduits which extend vertically out through the dome of the tank car and in turn are connected to a source of compressed air. After the flow of air through the piping arrangement in the tank car is started, heated calcium chloride liquor having a calcium chloride content of approximately 70-72% at a temperature of 335°–345° F. is fed into the tank car through a steam jacketed line at a rate of approximately 1000 gallons per hour. Air continues to pass through the body of calcium chloride liquor in the tank car at the rate of approximately 30,000 cubic feet per hour until about 9000 gallons of calcium chloride liquor enter the tank car and then the flow of liquor is stopped, but the air flow is continued for 24 hours or more. The air and liquor supply pipes are then disconnected and the tank car containing solid calcium chloride in porous condition is ready for transportation to the desired destination after closing the dome cover.

The tank car is prepared for unloading the calcium chloride by connecting a source of water supply to the pump inlet and discharging through the pump outlet and pipe lines to the air pipes in bottom of car, issuing through the approximately 800 1/8 inch holes near the bottom of the porous mass. Solution above the solid calcium chloride is returned to the pump for recirculation or for discharge to storage by means of suitable piping and including a section of flexible hose connected to a short length perforated near the lower end and capped. The flexible hose is of sufficient length to permit the perforated pipe inlet to ride on the surface of the solid calcium chloride and to lower in the car as the surface of the solid lowers during dissolving. Pipe connections also are made for discharging water onto the surface of the solid calcium chloride in the tank car for diluting solution when desired.

Water is first introduced by means of the pump into the horizontal pipes lying on the bottom of the tank, out through the orifices in these pipes, permeating the entire body of solid calcium chloride, until the solid is covered with about 10 inches of water solution. Circulation of the liquid from the top of the tank car through the pump and back to the car through the air lines at a rate of 200–300 gallons per minute is started without the further addition of water until the calcium chloride concentration of the solution in the tank car reaches approximately 30% whereupon the solution is continuously bled off from the drawoff line on the discharge side of the pump and water simultaneously added as required so that there is always a liquid layer covering the solid calcium chloride in the tank car. Hydrometer determinations of the calcium chloride content in the solution in the tank car are the means of indicating the rate of withdrawal of calcium chloride solution and the rate of feeding water to obtain the desired calcium chloride solution. The addition of water, recirculation of calcium chloride solution and withdrawal of calcium chloride solution is continued until all of the solid calcium chloride is dissolved. Complete dissolution of all the solid calcium chloride occurs in from 17 to 24 hours.

Instead of discharging or bleeding 30% calcium chloride solution to storage continuously, a batch method of dissolving may be used. Water is first introduced into the porous mass of solid calcium chloride through the air orifices as previously described until the solid is covered with about 10 inches of water solution. If the concentration of the solution is approximately 30% it is immediately pumped to storage; if less than 30%, the solution is recirculated to facilitate dissolution of the solid calcium chloride until the concentration reaches approximately 30% and is then pumped to storage; if higher than 30%, water is added through the dome or through the pump inlet line to produce the desired 30% concentration for pumping to storage.

When this solution has been removed from the tank car, water is again introduced through the porous mass of solid calcium chloride until the solid is again covered with a layer of water solution. This solution is pumped to storage when the approximate 30% calcium chloride solution is obtained by recirculation or by dilution with water and this procedure repeated until the solid mass of calcium chloride is completely dissolved as a 30% solution. When most of the solid mass has been dissolved, care must be taken to add only sufficient water to produce approximately a 30% solution by dissolution of the remaining solid calcium chloride.

Although certain preferred embodiments of the invention have been disclosed for purpose of illustration, it will be evident that various changes and modifications may be made therein without departing from the scope and spirit of the invention.

I claim:

1. A method of loading and unloading highly concentrated calcium chloride liquor in tank cars which comprises loading a tank car by introducing heated highly concentrated calcium chloride solution into the tank car, passing air through the heated calcium chloride solution in the tank car thereby accelerating the cooling of the calcium chloride solution and forming a porous calcium chloride solid in the tank car; unloading the tank car by introducing water into the porous calcium chloride solid to produce a dilute calcium chloride solution and withdrawing the dilute calcium chloride solution from the tank car.

2. A method of loading and unloading highly concentrated calcium chloride liquor in tank cars which comprises loading a tank car by introducing heated highly concentrated calcium chloride solution into the tank car, passing air through the heated calcium chloride solution in the tank car thereby accelerating cooling of the calcium chloride solution and forming a porous calcium chloride solid in the tank car; unloading the tank car by introducing water into the bottom of the porous calcium chloride solid to produce a dilute calcium chloride solution, recirculating the dilute calcium chloride solution to facilitate dissolution of the solid calcium chloride and withdrawing dilute calcium choride solution from the tank car.

3. A method of loading and unloading highly concentrated calcium chloride liquor in tank cars which comprises loading a tank car by introducing molten calcium chloride of 60-73% calcium chloride content into the tank car, passing air through the molten calcium chloride in the tank car thereby accelerating the cooling of the molten calcium chloride and forming a porous calcium chloride solid in the tank car; unloading the tank car by introducing water to the porous calcium chloride solid to produce a dilute calcium chloride solution, recirculating the dilute calcium chloride solution to facilitate dissolution of the solid calcium chloride and withdrawing approximately 30% calcium chloride solution from the tank car.

4. A method of loading and unloading highly concentrated calcium chloride liquor in tank cars which comprises loading a tank car by introducing heated highly concentrated calcium chloride solution into the tank car, simultaneously introducing compressed air at a series of spaced points into the bottom of the tank car thereby accelerating the cooling of the calcium chloride solution and forming a porous calcium chloride solid in the tank car; unloading the tank car by introducing water at said series of spaced points into the body of porous calcium chloride solid to produce a dilute calcium chloride solution, recirculating the dilute calcium chloride solution to facilitate dissolution of the solid calcium chloride, withdrawing dilute calcium chloride solution from the tank car, and adding water to the tank car in an amount sufficient to maintain a liquid layer above the surface of the solid calcium chloride during dissolution thereof.

5. A method of loading and unloading highly concentrated calcium chloride liquor in tank cars which comprises loading a tank car by introducing heated highly concentrated calcium chloride solution into the tank car, passing air through the heated calcium chloride solution in the tank car thereby accelerating the cooling of the calcium chloride solution and forming a porous calcium chloride solid in the tank car; unloading the tank car by introducing water to the porous calcium chloride solid until the solid is covered with a layer of water solution, recirculating this solution until the concentration reaches about 30%, bleeding off about 30% liquor to storage while continuing to recirculate and introduce water to the porous solid calcium chloride to maintain a liquid layer of approximately 30% concentration above the surface of the solid calcium chloride during dissolution thereof.

6. A method of loading and unloading highly concentrated calcium chloride liquor in tank cars which comprises loading a tank car by introducing heated highly concentrated calcium chloride solution into the tank car, simultaneously passing compressed air through the heated calcium chloride solution thereby forming a porous calcium chloride solid in the tank car; unloading the tank car by (1) introducing water to the porous solid calcium chloride thereby producing a dilute calcium chloride solution, (2) recirculating the dilute solution to facilitate dissolution of the solid calcium chloride in the tank car and increase the concentration of the solution to approximately 30% calcium chloride, (3) withdrawing this solution from the tank car and repeating steps (1), (2) and (3) until the solid calcium chloride in the tank car is substantially completely dissolved.

HAROLD D. LOSS.

No references cited.